US008554037B2

(12) United States Patent
Peng et al.

(10) Patent No.: US 8,554,037 B2
(45) Date of Patent: Oct. 8, 2013

(54) HYBRID WAVEGUIDE DEVICE IN POWERFUL LASER SYSTEMS

(75) Inventors: Xiang Peng, Hercules, CA (US); Michael Mielke, Santa Rosa, CA (US); Timothy Booth, Penngrove, CA (US)

(73) Assignee: Raydiance, Inc., Petaluma, CA (US)

( * ) Notice: Subject to any disclaimer, the term of this patent is extended or adjusted under 35 U.S.C. 154(b) by 222 days.

(21) Appl. No.: 12/895,834

(22) Filed: Sep. 30, 2010

(65) Prior Publication Data
US 2012/0082410 A1    Apr. 5, 2012

(51) Int. Cl.
    *G02B 6/02*    (2006.01)
(52) U.S. Cl.
    USPC ........................................... 385/125
(58) Field of Classification Search
    USPC ........................................... 385/125
    See application file for complete search history.

(56) References Cited

U.S. PATENT DOCUMENTS

| | | |
|---|---|---|
| 3,602,836 A | 8/1971 | Young |
| 3,622,907 A | 11/1971 | Tomlinson et al. |
| 3,628,179 A | 12/1971 | Cuff |
| 3,631,362 A | 12/1971 | Almasi |
| 3,696,308 A | 10/1972 | Duffy et al. |
| 3,735,282 A | 5/1973 | Gans |
| 3,764,641 A | 10/1973 | Ash |
| 3,808,549 A | 4/1974 | Maurer |
| 3,942,127 A | 3/1976 | Fluhr et al. |
| 3,963,953 A | 6/1976 | Thornton, Jr. |
| 4,389,617 A | 6/1983 | Kurnit |
| 4,394,623 A | 7/1983 | Kurnit |
| 4,449,215 A | 5/1984 | Reno |
| 4,655,547 A | 4/1987 | Heritage et al. |
| 4,722,591 A | 2/1988 | Haffner |
| 4,750,809 A | 6/1988 | Kafka et al. |
| 4,815,079 A | 3/1989 | Snitzer et al. |
| 4,824,598 A | 4/1989 | Stokowski |
| 4,829,529 A | 5/1989 | Kafka |

(Continued)

FOREIGN PATENT DOCUMENTS

| | | |
|---|---|---|
| EP | 0214100 | 3/1987 |
| EP | 0691563 | 1/1996 |

(Continued)

OTHER PUBLICATIONS

Agostinelli, J. et al., "Optical Pulse Shaping with a Grating Pair," Applied Optics, vol. 18, No. 14, pp. 2500-2504, Jul. 15, 1979.

(Continued)

*Primary Examiner* — Sung Pak
(74) *Attorney, Agent, or Firm* — Haverstock & Owens, LLP

(57) ABSTRACT

A hybrid waveguide device includes a hollow core fiber having a core formed by a combination of solid material and gases. The hybrid nature of the core allows the hybrid device to transport a high energy high power laser beam having an ultra-short pulse width without damage to the hybrid device due to a higher tolerance of irradiance than single-matter cores. A waveguide device having a core with gases in addition to solid matter is characterized by a lower nonlinear refractive index coefficient ($n_2$), lower numerical aperture, larger delivering laser beam size, and higher ionization potential of the gases. As a result, the hybrid waveguide fiber can transport ultra-short laser pulses having ablative energy levels and power levels, for example from a laser generating subassembly to a laser material-modification subassembly.

39 Claims, 8 Drawing Sheets

(56) References Cited

U.S. PATENT DOCUMENTS

| | | |
|---|---|---|
| 4,849,036 A | 7/1989 | Powell et al. |
| 4,913,520 A | 4/1990 | Kafka |
| 4,983,034 A | 1/1991 | Spillman, Jr. |
| 5,010,555 A | 4/1991 | Madey et al. |
| 5,022,042 A | 6/1991 | Bradley |
| 5,043,991 A | 8/1991 | Bradley |
| 5,095,487 A | 3/1992 | Meyerhofer et al. |
| 5,132,996 A | 7/1992 | Moore et al. |
| 5,162,643 A | 11/1992 | Currie |
| 5,237,576 A | 8/1993 | DiGiovanni et al. |
| 5,257,273 A | 10/1993 | Farries et al. |
| 5,265,107 A | 11/1993 | Delfyett, Jr. |
| 5,267,077 A | 11/1993 | Blonder |
| 5,278,853 A | 1/1994 | Shirai et al. |
| 5,291,501 A | 3/1994 | Hanna |
| 5,302,835 A | 4/1994 | Bendett et al. |
| 5,313,262 A | 5/1994 | Leonard |
| 5,315,431 A | 5/1994 | Masuda et al. |
| 5,315,436 A | 5/1994 | Lowenhar et al. |
| 5,329,398 A | 7/1994 | Lai et al. |
| 5,367,143 A | 11/1994 | White, Jr. |
| 5,400,350 A | 3/1995 | Galvanauskas |
| 5,414,725 A | 5/1995 | Fermann et al. |
| 5,430,572 A | 7/1995 | DiGiovanni et al. |
| 5,440,573 A | 8/1995 | Fermann |
| 5,446,813 A | 8/1995 | Lee et al. |
| 5,450,427 A | 9/1995 | Fermann et al. |
| 5,479,422 A | 12/1995 | Fermann et al. |
| 5,489,984 A | 2/1996 | Hariharan et al. |
| 5,499,134 A | 3/1996 | Galvanauskas et al. |
| 5,590,142 A | 12/1996 | Shan |
| 5,592,327 A | 1/1997 | Gabl et al. |
| 5,596,668 A | 1/1997 | DiGiovanni et al. |
| 5,602,673 A | 2/1997 | Swan |
| 5,602,677 A | 2/1997 | Tournois |
| 5,615,043 A | 3/1997 | Plaessmann et al. |
| 5,617,434 A | 4/1997 | Tamura et al. |
| 5,627,848 A | 5/1997 | Fermann et al. |
| 5,631,771 A | 5/1997 | Swan |
| 5,633,885 A | 5/1997 | Galvanauskas et al. |
| 5,642,447 A | 6/1997 | Pan et al. |
| 5,644,424 A | 7/1997 | Backus et al. |
| 5,651,018 A | 7/1997 | Mehuys et al. |
| 5,656,186 A | 8/1997 | Mourou et al. |
| 5,657,153 A | 8/1997 | Endriz et al. |
| 5,661,829 A | 8/1997 | Zheng |
| 5,677,769 A | 10/1997 | Bendett |
| 5,689,361 A | 11/1997 | Damen et al. |
| 5,689,519 A | 11/1997 | Fermann et al. |
| 5,694,501 A | 12/1997 | Alavie et al. |
| 5,696,782 A | 12/1997 | Harter et al. |
| 5,701,319 A | 12/1997 | Fermann |
| 5,708,669 A | 1/1998 | DiGiovanni et al. |
| 5,734,762 A | 3/1998 | Ho et al. |
| 5,771,253 A | 6/1998 | Chang-Hasnain et al. |
| 5,786,117 A | 7/1998 | Hoshi et al. |
| 5,790,574 A | 8/1998 | Rieger et al. |
| 5,818,630 A | 10/1998 | Fermann et al. |
| 5,822,097 A | 10/1998 | Tournois |
| 5,847,863 A | 12/1998 | Galvanauskas et al. |
| 5,862,287 A | 1/1999 | Stock et al. |
| 5,867,304 A | 2/1999 | Galvanauskas et al. |
| 5,875,408 A | 2/1999 | Bendett et al. |
| 5,880,877 A | 3/1999 | Fermann et al. |
| 5,898,485 A | 4/1999 | Nati, Jr. |
| 5,907,157 A | 5/1999 | Yoshioka et al. |
| 5,920,668 A | 7/1999 | Uehara et al. |
| 5,923,686 A | 7/1999 | Fermann et al. |
| 5,933,271 A | 8/1999 | Waarts et al. |
| 6,014,249 A | 1/2000 | Fermann et al. |
| 6,020,591 A | 2/2000 | Harter et al. |
| 6,061,373 A | 5/2000 | Brockman et al. |
| 6,072,811 A | 6/2000 | Fermann et al. |
| 6,081,369 A | 6/2000 | Waarts et al. |
| 6,088,153 A | 7/2000 | Anthon et al. |
| 6,130,780 A | 10/2000 | Joannopoulos et al. |
| 6,141,140 A | 10/2000 | Kim |
| 6,151,338 A | 11/2000 | Grubb et al. |
| 6,154,310 A | 11/2000 | Galvanauskas et al. |
| 6,175,437 B1 | 1/2001 | Diels et al. |
| 6,181,463 B1 | 1/2001 | Galvanauskas et al. |
| 6,198,568 B1 | 3/2001 | Galvanauskas et al. |
| 6,201,914 B1 | 3/2001 | Duguay et al. |
| 6,208,458 B1 | 3/2001 | Galvanauskas et al. |
| 6,228,748 B1 | 5/2001 | Anderson et al. |
| 6,246,816 B1 | 6/2001 | Moore et al. |
| 6,249,630 B1 | 6/2001 | Stock et al. |
| 6,252,892 B1 | 6/2001 | Jiang et al. |
| 6,256,328 B1 | 7/2001 | Delfyett et al. |
| 6,275,250 B1 | 8/2001 | Sanders et al. |
| 6,275,512 B1 | 8/2001 | Fermann |
| 6,327,074 B1 | 12/2001 | Bass et al. |
| 6,330,383 B1 | 12/2001 | Cai et al. |
| 6,334,017 B1 | 12/2001 | West |
| 6,335,821 B1 | 1/2002 | Suzuki et al. |
| 6,370,422 B1 | 4/2002 | Richards-Kortum et al. |
| 6,371,469 B1 | 4/2002 | Gray |
| 6,400,871 B1 | 6/2002 | Minden |
| 6,404,944 B1 | 6/2002 | Wa et al. |
| 6,418,256 B1 | 7/2002 | Danziger et al. |
| 6,425,912 B1 | 7/2002 | Knowlton |
| 6,433,760 B1 | 8/2002 | Vaissie et al. |
| 6,501,590 B2 | 12/2002 | Bass et al. |
| 6,522,460 B2 | 2/2003 | Bonnedal et al. |
| 6,549,547 B2 | 4/2003 | Galvanauskas et al. |
| 6,556,733 B2 | 4/2003 | Dy et al. |
| 6,562,698 B2 | 5/2003 | Manor |
| 6,570,704 B2 | 5/2003 | Palese |
| 6,573,813 B1 | 6/2003 | Joannopoulos et al. |
| 6,580,553 B2 | 6/2003 | Kim et al. |
| 6,587,488 B1 | 7/2003 | Meissner et al. |
| 6,592,574 B1 | 7/2003 | Shimmick et al. |
| 6,597,497 B2 | 7/2003 | Wang et al. |
| 6,603,903 B1 | 8/2003 | Tong et al. |
| 6,603,911 B2 | 8/2003 | Fink et al. |
| 6,614,565 B1 | 9/2003 | Klug et al. |
| 6,647,031 B2 | 11/2003 | Delfyett et al. |
| 6,654,161 B2 | 11/2003 | Bass et al. |
| 6,661,568 B2 | 12/2003 | Hollemann et al. |
| 6,671,298 B1 | 12/2003 | Delfyett et al. |
| 6,700,698 B1 | 3/2004 | Scott |
| 6,711,334 B2 | 3/2004 | Szkopek et al. |
| 6,716,475 B1 | 4/2004 | Fink et al. |
| 6,735,368 B2 | 5/2004 | Parker et al. |
| 6,738,144 B1 | 5/2004 | Dogariu |
| 6,744,552 B2 * | 6/2004 | Scalora et al. ............... 359/326 |
| 6,744,555 B2 | 6/2004 | Galvanauskas et al. |
| 6,747,795 B2 | 6/2004 | Lin et al. |
| 6,760,356 B2 | 7/2004 | Erbert et al. |
| 6,774,869 B2 | 8/2004 | Biocca et al. |
| 6,785,303 B1 | 8/2004 | Holzwarth et al. |
| 6,785,445 B2 | 8/2004 | Kuroda et al. |
| 6,788,864 B2 | 9/2004 | Ahmad et al. |
| 6,791,071 B2 | 9/2004 | Woo et al. |
| 6,801,550 B1 | 10/2004 | Snell et al. |
| 6,807,353 B1 | 10/2004 | Fleming et al. |
| 6,819,702 B2 | 11/2004 | Sverdlov et al. |
| 6,819,837 B2 | 11/2004 | Li et al. |
| 6,822,187 B1 | 11/2004 | Hermann et al. |
| 6,822,251 B1 | 11/2004 | Arenberg et al. |
| 6,834,134 B2 | 12/2004 | Brennan, III et al. |
| 6,882,772 B1 | 4/2005 | Lowery et al. |
| 6,915,040 B2 | 7/2005 | Willner et al. |
| 6,937,629 B2 | 8/2005 | Perry et al. |
| 6,956,680 B2 | 10/2005 | Morbieu et al. |
| 7,001,373 B2 | 2/2006 | Clapham et al. |
| 7,006,730 B2 | 2/2006 | Doerr |
| 7,031,571 B2 | 4/2006 | Mihailov et al. |
| 7,088,756 B2 | 8/2006 | Fermann et al. |
| 7,099,549 B2 | 8/2006 | Scheuer et al. |
| 7,171,074 B2 | 1/2007 | DiGiovanni et al. |
| 7,257,302 B2 | 8/2007 | Fermann et al. |
| 7,289,707 B1 | 10/2007 | Chavez-Pirson et al. |
| 7,321,605 B2 | 1/2008 | Albert |

(56) References Cited

U.S. PATENT DOCUMENTS

| | | | |
|---|---|---|---|
| 7,321,713 B2 | 1/2008 | Akiyama et al. | |
| 7,349,452 B2 | 3/2008 | Brennan, III et al. | |
| 7,349,589 B2 * | 3/2008 | Temelkuran et al. | 385/11 |
| 7,414,780 B2 * | 8/2008 | Fermann et al. | 359/337 |
| 7,444,049 B1 | 10/2008 | Kim et al. | |
| 7,518,788 B2 | 4/2009 | Fermann et al. | |
| 7,584,756 B2 | 9/2009 | Zadoyan et al. | |
| 7,674,719 B2 | 3/2010 | Li et al. | |
| 7,675,674 B2 | 3/2010 | Bullington et al. | |
| 7,751,118 B1 * | 7/2010 | Di Teodoro et al. | 359/333 |
| 7,759,607 B2 | 7/2010 | Chism, II | |
| 7,773,216 B2 | 8/2010 | Cheng et al. | |
| 7,773,294 B2 | 8/2010 | Brunet et al. | |
| 7,792,408 B2 * | 9/2010 | Varming | 385/147 |
| 2001/0021294 A1 | 9/2001 | Cai et al. | |
| 2002/0051606 A1 | 5/2002 | Takushima et al. | |
| 2002/0071454 A1 | 6/2002 | Lin | |
| 2002/0115273 A1 | 8/2002 | Chandra et al. | |
| 2002/0118934 A1 | 8/2002 | Danziger et al. | |
| 2002/0176676 A1 | 11/2002 | Johnson et al. | |
| 2002/0186915 A1 | 12/2002 | Yu et al. | |
| 2003/0011782 A1 | 1/2003 | Tanno | |
| 2003/0031410 A1 | 2/2003 | Schnitzer | |
| 2003/0039442 A1 | 2/2003 | Bond et al. | |
| 2003/0053508 A1 | 3/2003 | Dane et al. | |
| 2003/0055413 A1 | 3/2003 | Altshuler et al. | |
| 2003/0086647 A1 | 5/2003 | Willner et al. | |
| 2003/0142705 A1 | 7/2003 | Hackel et al. | |
| 2003/0156605 A1 | 8/2003 | Richardson et al. | |
| 2003/0161378 A1 | 8/2003 | Zhang et al. | |
| 2003/0178396 A1 | 9/2003 | Naumov et al. | |
| 2003/0189959 A1 | 10/2003 | Erbert et al. | |
| 2003/0202547 A1 | 10/2003 | Fermann et al. | |
| 2003/0214714 A1 | 11/2003 | Zheng | |
| 2003/0223689 A1 | 12/2003 | Koch et al. | |
| 2004/0000942 A1 | 1/2004 | Kapteyn et al. | |
| 2004/0022695 A1 | 2/2004 | Simon et al. | |
| 2004/0037505 A1 | 2/2004 | Morin | |
| 2004/0042061 A1 | 3/2004 | Islam et al. | |
| 2004/0226922 A1 | 11/2004 | Flanagan | |
| 2004/0263950 A1 | 12/2004 | Fermann et al. | |
| 2005/0008044 A1 | 1/2005 | Fermann et al. | |
| 2005/0018986 A1 | 1/2005 | Argyros et al. | |
| 2005/0105865 A1 | 5/2005 | Fermann et al. | |
| 2005/0111073 A1 | 5/2005 | Pan et al. | |
| 2005/0111500 A1 | 5/2005 | Harter et al. | |
| 2005/0163426 A1 | 7/2005 | Fermann et al. | |
| 2005/0171516 A1 | 8/2005 | Stoltz et al. | |
| 2005/0175280 A1 | 8/2005 | Nicholson | |
| 2005/0195726 A1 | 9/2005 | Bullington et al. | |
| 2005/0213630 A1 | 9/2005 | Mielke et al. | |
| 2005/0215985 A1 | 9/2005 | Mielke et al. | |
| 2005/0225846 A1 | 10/2005 | Nati et al. | |
| 2005/0232560 A1 | 10/2005 | Knight et al. | |
| 2005/0238070 A1 | 10/2005 | Imeshev et al. | |
| 2005/0259944 A1 | 11/2005 | Anderson et al. | |
| 2005/0265407 A1 | 12/2005 | Braun et al. | |
| 2005/0271094 A1 | 12/2005 | Miller et al. | |
| 2005/0271340 A1 | 12/2005 | Weisberg et al. | |
| 2005/0274702 A1 | 12/2005 | Deshi | |
| 2006/0050750 A1 | 3/2006 | Barty | |
| 2006/0064079 A1 | 3/2006 | Stoltz et al. | |
| 2006/0093012 A1 | 5/2006 | Singh et al. | |
| 2006/0093265 A1 | 5/2006 | Jia et al. | |
| 2006/0120418 A1 | 6/2006 | Harter et al. | |
| 2006/0126679 A1 | 6/2006 | Brennan, III et al. | |
| 2006/0159137 A1 | 7/2006 | Shah | |
| 2006/0209908 A1 | 9/2006 | Pedersen et al. | |
| 2006/0210275 A1 * | 9/2006 | Vaissie et al. | 398/84 |
| 2006/0221449 A1 | 10/2006 | Glebov et al. | |
| 2006/0249816 A1 | 11/2006 | Li et al. | |
| 2006/0268949 A1 | 11/2006 | Gohle et al. | |
| 2007/0064304 A1 | 3/2007 | Brennan, III et al. | |
| 2007/0121686 A1 | 5/2007 | Vaissie et al. | |
| 2007/0196048 A1 | 8/2007 | Galvanauskas et al. | |
| 2007/0273960 A1 | 11/2007 | Fermann et al. | |
| 2008/0050078 A1 * | 2/2008 | Digonnet et al. | 385/125 |
| 2008/0058781 A1 | 3/2008 | Langeweyde et al. | |
| 2008/0232407 A1 | 9/2008 | Harter et al. | |
| 2008/0240184 A1 | 10/2008 | Cho et al. | |
| 2009/0020511 A1 | 1/2009 | Kommera et al. | |
| 2009/0219610 A1 | 9/2009 | Mourou et al. | |
| 2009/0290151 A1 | 11/2009 | Agrawal et al. | |
| 2009/0297155 A1 | 12/2009 | Weiner et al. | |
| 2010/0013036 A1 | 1/2010 | Carey | |
| 2010/0040095 A1 | 2/2010 | Mielke et al. | |
| 2010/0142034 A1 | 6/2010 | Wise et al. | |
| 2010/0181284 A1 | 7/2010 | Lee et al. | |

FOREIGN PATENT DOCUMENTS

| | | |
|---|---|---|
| EP | 1462831 | 9/2004 |
| JP | 8171103 | 7/1996 |
| JP | 11189472 | 7/1999 |
| JP | 2003181661 | 7/2003 |
| JP | 2003344883 | 12/2003 |
| JP | 2005174993 | 6/2005 |
| WO | WO9428972 | 12/1994 |
| WO | WO2004105100 | 12/2004 |
| WO | WO2004114473 | 12/2004 |
| WO | WO2005018060 | 2/2005 |
| WO | WO2005018061 | 2/2005 |
| WO | WO2005018062 | 2/2005 |
| WO | WO2005018063 | 2/2005 |
| WO | WO2007034317 | 3/2007 |

OTHER PUBLICATIONS

Anastassiou et al., "Photonic Bandgap Fibers Exploiting Omnidirectional Reflectivity Enable Flexible Delivery of Infrared Lasers for Tissue Cutting," Proceedings of the SPIE—the International Society for Optical Engineering, SPIE, US, vol. 5317, No. 1, Jan. 1, 2004, pp. 29-38, XP002425586 ISSN: 0277-786X.

Benoit, G. et al., "Dynamic All-optical Tuning of Transverse Resonant Cavity Modes in Photonic Bandgap Fibers," Optics Letters, vol. 30, No. 13, Jul. 1, 2005, pp. 1620-1622.

Chen, L. et al., "Ultrashort Optical Pulse Interaction with Fibre Gratings and Device Applications," 1997, Canaga, located at http://www.collectionscanada.ca/obj/s4/f2/dsk2/ftp04/mq29402.pfd.

Chen, X. et al., "Highly Birefringent Hollow-core Photonic Bandgap Fiber," Optics Express, vol. 12, No. 16, Aug. 9, 2004, pp. 3888-3893.

Chen, Y. et al., "Dispersion-Managed Mode Locking", Journal of the Optical Society of America B, Nov. 1999, pp. 1999-2004, vol. 16, No. 11, Optical Society of America.

Dasgupta, S. et al., "Design of Dispersion-Compensating Bragg Fiber with an Ultrahigh Figure of Merit," Optics Letters, Aug. 1, 2005, vol. 30, No. 15, Optical Society of America.

De Matos et al., "Multi-kilowatt, Picosecond Pulses from an All-fiber Chirped Pulse Amplification System Using Air-core Photonic Bandgalp Fiber", Lasers and Electro-optics, 2004, (CLEO), Conference on San Francisco, CA USA, May 20-21, 2004, Piscataway, NJ, USA, IEEE, vol. May 17, 2004, pp. 973-974, XP010745448 ISBN: 978-1-55752-777-6.

De Matos, C.J.S. et al., "All-fiber Chirped Pulse Amplification using Highly-dispersive Air-core Photonic Bandgap Fiber," Nov. 3, 2003, Optics Express, pp. 2832-2837, vol. 11, No. 22.

Delfyett, P. et al., "Ultrafast Semiconductor Laser-Diode-Seeded Cr:LiSAF Rengerative Amplifier System", Applied Optics, May 20, 1997, pp. 3375-3380, vol. 36, No. 15, Octoical Society of America.

Eggleton, et al., "Electrically Tunable Power Efficient Dispersion Compensating Fiber Bragg Grating," IEEE Photonics Technology Letters, vol. 11, No. 7, pp. 854-856, Jul. 1999.

Engeness et al., "Dispersion Tailoring and Compensation by Modal Interations in Omniguide Fibers," Optics Express, May 19, 2003, pp. 1175-1196, vol. 11, No. 10.

Fink et al., "Guiding Optical Light in Air Using an All-Dielectric Structure," Journal of Lightwave Technology, Nov. 1999, pp. 2039-2041, vol. 17, No. 11.

(56) References Cited

OTHER PUBLICATIONS

Folkenberg, J.R., et al., "Broadband Single-polarization Photonic Crystal Fiber," Optics Letters, vol. 30, No. 12, Jun. 15, 2005, pp. 1446-1448.
Folkenberg, J.R., et al., "Polarization Maintaining Large Mode Area Photonic Crystal Fiber," Optics Express vol. 12, No. 5, Mar. 8, 2004, pp. 956-960.
Futami, F., et al., "Wideband Fibre Dispersion Equalisation up to Fourth-order for Long-distance Sub-picosecond Optical Pulse Transmission," Electronics Letters, vol. 35, No. 25, Dec. 9, 1999.
Galvanauskas, A. et al., "Chirped-pulse-amplification Circuits for Fiber Amplifiers, Based on Chirped-period Quasi-phase, matching gratings", Optics Letters, Nov. 1, 1998, p. 1695-1697, vol. 23, No. 21, Optical Society of America.
Hartl et al., "In-line high energy Yb Fiber Laser Based Chirped Pulse Amplifier System", Laser and Electro-Optics, 2004, (CLEO) Conference of San Francisco, CA USA May 20-21, 2004, Piscataway, NJ, USA, IEEE, vol. 1, May 17, 2004, pp. 563-565, XP010745382, ISBN: 978-1-55752-777-6.
Hellstrom, E. et al., "Third-order Dispersion Compensation Using a Phase Modulator", Journal of Lightwave Technology, vol. 21, No. 5, pp. 1188-1197, May 2003.
Heritage, J. P. et al., "Picosecond Pulse Shaping by Spectral Phase and Amplitude Manipulation," Optics Letters, vol. 10, No. 12, pp. 609-611, Dec. 1985.
Heritage, J.P. et al., "Spectral Windowing of Frequency-Modulated Optical Pulses in a Grating Compressor," Applied Physics Letters, vol. 47, No. 2, pp. 87-89, Jul. 15, 1985.
Hill, K. et al., "Fiber Bragg Grating Technology Fundamentals and Overview," Journal of Lightwave Technology, Aug. 1997, vol. 15, No. 8, pp. 1263-1276.
Ibanescu et al., "Analysis of Mode Structure in Hollow Dielctric Waveguide Fibers," Physical Review E 67, 2003, The American Physical Society.
Jiang, et al., "Fully Dispersion Compensated ~500 fs Pulse Transmission Over 50 km Single Mode Fiber," Optics Letters, vol. 30, No. 12, pp. 1449-1451, Jun. 15, 2005.
Jiang, et al., "Fully Dispersion Compensated ~500 fs Pulse Transmission Over 50 km Single Mode Fiber," Purdue University ECE Annual Research Summary, Jul. 1, 2004-Jun. 30, 2005.
Killey, et al., "Electronic Dispersion Compensation by Signal Predistortion Using Digital Processing and a Dual-Drive Mach-Zehnder Modulator," IEEE Photonics Technology Letters, vol. 17, No. 3, pp. 714-716, Mar. 2005.
Kim, K. et al., "1.4kW High Peak Power Generation from an All Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.
Koechner, "Solid State Laser Engineering", Oct. 29, 1999, Section 5.5, pp. 270-277, 5th Edition, Springer.
Kwon, et al., "Tunable Dispersion Slope Compensator Using a Chirped Fiber Bragg Grating Tuned by a Fan-shaped Thin Metallic Heat Channel," IEEE Photonics Technology Letters, vol. 18, No. 1, pp. 118-120, Jan. 1, 2006.
Kyungbum, Kim et al., "1.4kW High Peak Power Generation from an all Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.
Levy et al., "Engineering Space-Variant Inhomogeneous Media for Polarization Control," Optics Letters, Aug. 1, 2004, pp. 1718-1720, vol. 29, No. 15, Optical Society of America.
Liao, Kai-Hsiu et al., "Large-aperture Chirped Volume Bragg Grating Based Fiber CPA System," Optics Express, Apr. 16, 2007, vol. 15, No. 8, pp. 4876-4882.
Limpert et al., "All Fiber Chiped-Pulse Amplification System Based on Compression in Air-Guiding Photonic Bandgap Fiber", Optics Express, Dec. 1, 2003, vol. 11, No. 24, pp. 3332-3337.
Lo, S. et al., "Semiconductor Hollow Optical Waveguides Formed by Omni-directional Reflectors", Optics Express, vol. 12, No. 26, Dec. 27, 2004, pp. 6589-6593.
Malinowski A. et al., "Short Pulse High Power Fiber Laser Systems," Proceedings of the 2005 Conference on Lasers and Electro-Optics (CLEO), Paper No. CThG3, pp. 1647-1649, May 26, 2005.
Mehier-Humbert, S. et al., "Physical Methods for Gene Transfer: Improving the Kinetics of Gene Delivery Into Cells," Advanced Drug Delivery Reviews, vol. 57, pp. 733-753, 2005.
Mohammed, W. et al., "Selective Excitation of the TE01 Mode in Hollow-Glass Waveguide Using a Subwavelength Grating," IEEE Photonics Technology Letters, Jul. 2005, vol. 17, No. 7, IEEE.
Nibbering, E.T.J., et al. "Spectral Determination of the Amplitude and the Phase of Intense Ultrashort Optical Pulses," Journal Optical Society of America B, vol. 13, No. 2, pp. 317-329, Feb. 1996.
Nicholson, J. et al., "Propagation of Femotsecond Pulses in Large-mode-area, Higher-order-mode Fiber," Optics Letters, vol. 31, No. 21, 2005, pp. 3191-3193.
Nishimura et al., "In Vivo Manipulation of Biological Systems with Femtosecond Laser Pulses," Proc. SPIE 6261, 62611J, pp. 1-10, 2006.
Noda, J. et al., "Polarization-maintaining Fibers and Their Applications", Journal of Lightwave Technology, vol. Lt-4, No. 8 Aug. 1986, pp. 1071-1089.
Palfrey et al., "Generation of 16-FSEC Frequency-tunable Pulses by Optical Pulse compression" Optics Letters, OSA, Optical Society of america, Washington, DC, USA, vol. 10, No. 11, Nov. 1, 1985, pp. 562-564, XP000710358 ISSN: 0146-9592.
Pelusi, M. et al. "Electrooptic Phase Modulation of Stretched 250-fs Pulses for Suppression of Third-Order Fiber Disperson in Transmission", IEEE Photonics Technology Letters, vol. 11, No. 11, Nov. 1999, pp. 1461-1463.
Pelusi, M. D. et al., "Phase Modulation of Stretched Optical Pulses for Suppression of Third-order Dispersion Effects in fibre Transmission," Electronics Letters, vol. 34, No. 17, pp. 1675-1677, Aug. 20, 1998.
Price et al., "Advances in High Power, Short Pulse, Fiber Laser Systems and Technology", Photonics West 2005, San Jose, California, Jan. 2005, pp. 5709-3720.
Price et al., "Advances in High Power, Short Pulse, Fiber Laser Systems and Technology", Proceedings of SPIE—vol. 5709, Fiber Lasers II: Technology, Systems, and Applications, Apr. 2005, pp. 184-192.
Ramachandran, S., et al., "High-power Amplification in a 2040-µm2 Higher Order Mode," SPIE Photonics West 2007, Post-deadline.
Resan et al., "Dispersion-Managed Semiconductor Mode-Locked Ring Laser", Optics Letters, Aug. 1, 2003, pp. 1371-1373, vol. 28, No. 15, Optical Society of America.
Schreiber, T., et al., "Design and High Power Operation of a Stress-induced single Polarization Single-transverse Mode LMA Yb-doped Photonic Crystal Fiber," Fiber Lasers III: Technology, Systems, and Applications, Andrew J.W. Brown, Johan Nilsson, Donald J. Harter, Andreas Tünnermann, eds., Proc. of SPIE, vol. 6102, pp. 61020C-1-61020C-9, 2006.
Schreiber, T., et al., "Stress-induced Single-polarization Single-transverse Mode Photonic Crystal Fiber with Low Nonlinearity," Optics Express, vol. 13, No. 19, Sep. 19, 2005, pp. 7621-7630.
Siegman, "Unstable Optical Resonators", Applied Optics, Feb. 1974, pp. 353-367, vol. 13, No. 2.
Stevenson et al., Femtosecond Optical Transfection of Cells: Viability and Efficiency, Optics Express, vol. 14, No. 16, pp. 7125-7133, Aug. 7, 2006.
Stock et al., "Chirped Pulse Amplification in an Erbium-doped fiber Oscillator/Erbium-doped Fiber Amplifier System", Optics Communications, North-Holland Publishing Co., Amsterdam, NL, vol. 106, No. 4/5/06, Mar. 15, 1994, pp. 249-252, XP000429901, ISSN: 0030-4018.
Strickland et al., "Compression of Amplified Chirped Optical Pulses", Optics Communications, North-Holland Publishing Co., Amersterdam, NL, vol. 56, No. 3, Dec. 1, 1985, pp. 219-221, XP024444933 ISSN: 0030-4018 (retrieved on Dec. 11, 1985.
Temelkuran, B. et al., "Wavelength-scalable Hollow Optical Fibres with Large Photonic Bandgaps for CO2 Laser Transmission," Nature, Dec. 12, 2002, pp. 650-653.

(56) References Cited

OTHER PUBLICATIONS

Thurston, R.N. et al., "Analysis of Picosecond Pulse Shape Synthesis by Spectral Masking in a Grating Pulse Compressor," IEEE Journal of Quantum Electronics, vol. EQ-22, No. 5, pp. 682-696, May 1986.

Tirlapur et al., "Targeted Transfection by Femtosecond Laser," Nature Publishing Group, vol. 418, pp. 290-291, Jul. 18, 2002.

Tsai et al., "Ultrashort Pulsed Laser Light," Optics & Photonics News, pp. 25-29, Jul. 2004.

Vaissie et al., "Desktop Ultra-Short Pulse Laser at 1552 nm," Ultrashort Pulse Laser Materials Interaction Workshop (Raydiance)—Directed Energy Professional Society (DEPS), Sep. 28, 2006.

Weiner, A.M. et al., "Synthesis of Phase-coherent, Picosecond Optical Square Pulses," Optics Letters, vol. 11, No. 3, pp. 153-155, Mar. 1986.

Weiner, A.M., "Femtosecond Optical Pulse Shaping and Processing," Prog. Quant. Electr. 1995, vol. 19, pp. 161-237, 1995.

Weiner, A.M., "High-resolution femtosecond Pulse Shaping," Journal of the Optical Society of America B. vol. 5, No. 8, pp. 1563-1572, Aug. 1988.

Wells, D.J., "Gene Therapy Progress and Prospects: electroporation and Other Physical Methods," Gene Therapy, Nature Publishing Group, vol. 11, pp. 1363-1369, Aug. 5, 2004, (http://www.nature.com/gt).

White, W.E., et al., "Compensation of Higher-order Frequency-dependent Phase Terms in Chirped-pulse Amplification Systems," Optics Letters, vol. 18, No. 16, pp. 1343-1345, Aug. 15, 1993.

Yamakawa et al., "1 Hz, 1 ps, terawatt Nd: glass laser", Optics Communications, North-Holland Publishing Co. Amsterdam, NL, vol. 112, No. 1-2, Nov. 1, 1994, pp. 37-42, XP024424285.

Yan et al., Ultrashort Pulse Measurement Using Interferometric Autocorrelator Based on Two-photon-absorbtion Detector at 1.55 μm Wavelength Region., 2005, Proceedings of SPIE vol. 5633, Advanced Materials and Devices for Sensing and Imaging II, pp. 424-429.

Yeh, et al. "Theory of Bragg Fiber", Journal of the Optical Society America, Sep. 1978, pp. 1196, vol. 68, No. 9., pp. 1196-1201.

Yi, Y. et al., "Sharp Bending of On-Chip silicon Bragg Cladding Waveguide With Light Guiding on Low Index Core Materials", IEEE Journal of Selected Topics in Quantum Electronics, vol. 12, No. 6, Nov./Dec. 2006, pp. 1345-1348.

Yi, Y., et al., "On-chip Si-based Bragg Cladding Waveguide with High Index Contrast Bilayers", Optics Express, vol. 12, No. 20, Oct. 4, 2004, pp. 4775-4780.

Yin, D. et al., "Integrated ARROW Waveguides with Hollow Cores", Optics Express, vol. 12, No. 12, Jun. 14, 2004, pp. 2710-2715.

Zhou, S. et al., "Compensation of nonlinear Phase Shifts with Third-order Dispersion in Short-pulse Fiber Amplifiers," Optics Express, vol. 13, No. 13, pp. 4869-2877, Jun. 27, 2005.

\* cited by examiner

HYBRID WAVEGUIDE DEVICE IN POWERFUL LASER SYSTEMS

BACKGROUND

Solid-core fiber waveguides are used to transport laser beams from a laser beam source to another device. FIG. 1 illustrates a typical solid-core fiber waveguide 100 of the prior art. Solid-core fiber waveguide 100 includes a core 120 and a concentric circular cladding ring 130. The core 120 extends along the solid-core fiber waveguide axis and has an index of refraction. The concentric annular cladding ring 130 surrounds core 120 and have a different index of refraction. Both the solid core 120 and concentric annular cladding ring 130 are formed by a single state of matter such as glass or other ceramic materials. The core 120 and concentric annular cladding ring 130 are encased by protective outer layer 110 such as polymer.

The core 120 and concentric annular cladding ring 130 of solid-core fiber waveguide 100 are comprised of a solid dielectric optical fiber. Though the solid-core fiber waveguide has many uses, the solid dielectric optical fiber waveguide is not suitable to transport certain laser beams. For example, laser beams with high energy, larger than 10 microjoules ($\mu J$), and ultra-short pulse widths, less than 10 picoseconds (ps), cause laser irradiance that induces pulse distortion and optical damage to the waveguide material. The irradiance cannot be reduced past a fundamental limit by expanding a mode field area since multi-mode effects set in or the guiding mechanism (for example the index contrast) is too weak for practical transport.

Previous hollow-core fiber waveguides, such as hollow-core Bragg fiber and hollow-core resonant photonic bandgap fiber, have been used to transport low energy, low power ultra-short pulse width lasers. The previous fiber formats are inherently difficult to manufacture with determinism and difficult to scale the performance for high energy or high power short pulse laser compatibility.

Bragg fibers require exotic polymer and glass materials to achieve the high/low refractive index contrast bilayers that form the concentric rings that comprise the multi-layer dielectric mirror-based waveguide, and the materials must have matched thermal and glass transition properties for realistic fiber draw techniques. Moreover, the state-of-the-art hollow-core Bragg fiber preform fabrication techniques have poor dimensional repeatability compared to telecommunications grade fiber processes.

In general, resonant photonic bandgap fibers, e.g. photonic crystal fiber, utilize a glass lattice in the core of the fiber to form a forbidden zone for in-band wavelength light. The lattice must have very precise cell diameter and cell wall thickness to sustain the forbidden zone that enables waveguiding. In particular, there is an upper limit on these dimensions above which the resonant photonic bandgap, hence the waveguide, does not form. Scaling the hollow core diameter to handle ablative energy/power level laser beams imposes too high a mechanical load for the thin cell walls to support. Thus, state-of-the-art resonant photonic bandgap fiber has a hollow core limit of 20 micrometers ($\mu m$) in diameter. Moreover, even the minimal heating caused by interaction between the fiber guided modes and the thin cell walls results in catastrophic fiber damage for pulse energy of several microjoules or average power much less than a watt.

A waveguide is needed that is suitable for use with high energy high power ultra-short pulse width lasers.

SUMMARY

The present technology includes a hybrid waveguide fiber device having a core formed by a combination of solid material, vacuum, a gas, a gas mixture, and a variety of gases. The hybrid waveguide fiber having a multiple-state of matter and a multiple-species of matter core enables the hybrid waveguide fiber to have a higher tolerance of irradiance than single-matter cores. A waveguide device having a core with vacuum, a gas, a gas mixture, or a few gases in addition to solid matter is characterized by a lower nonlinear refractive index coefficient ($n_2$), lower numerical aperture, larger delivering laser beam size, and higher ionization potential of the gas or gases. As a result, the hybrid waveguide fiber can transport ultra-short laser pulses having ablative energy levels and power levels, for example from a laser generating subassembly to a laser material-modification subassembly.

A waveguide device for providing an ultra-short duration optical pulse includes a waveguide fiber including a first core portion and a second core portion. The first core region includes a vacuum, a gas or a gas mixture within the waveguide fiber, The second core region may include a combination of a gas, a gas mixture, a few gases, a vacuum, and a solid within the waveguide fiber. A concentric circular outer cladding ring is used to further help confine the laser beam within the core region. The core region of the hybrid waveguide fiber may transport a laser beam having an ultra-short pulse with pulse energy larger than 10 microjoules and pulse duration less than 10 picoseconds, without significant spatial beam distortion.

A laser beam may be transported using a hybrid waveguide device. The laser beam having an ultra-short pulse width may be received by an input portion of a hybrid waveguide device. The laser beam may be transported through a core of the waveguide device. The waveguide device may include a first portion and a second portion, where the first portion may contain a gas, a gas mixture, or a vacuum, and the second portion may contain a gas, a gas mixture, a few gases, a vacuum, and a solid. The laser beam may be provided through an output portion of the waveguide device.

DETAILED DESCRIPTION

The present technology includes a hybrid waveguide fiber having a core formed by a solid material, a gas, a gas mixture, multiple gases, a vacuum, or a combination of such. The hybrid waveguide fiber having a multiple-state of matter and a multiple-species of matter core enables the fiber to have a higher tolerance of irradiance than single-matter cores. A waveguide device having a core with gas or gases in addition to solid matter is characterized by a lower nonlinear refractive index coefficient ($n_2$), lower numerical aperture, larger delivering beam size, and higher ionization potential of the gas. As a result, the hybrid waveguide fiber can transport ultra-short laser pulses having ablative energy and power levels, for example from a laser generating subassembly to a laser material-modification subassembly.

The hybrid waveguide device has a core with multiple states-of-matter and multiple-species of matter such as for example a first core region filled with gas and a second core region of a gas(s)-and-solid-combined-state-of-matter. The hybrid waveguide may be used for transporting, modifying, amplifying, or delivering optical pulses having high energy, high optical power, and ultra-short duration with diffraction-limited beam quality. A laser pulse with an energy density inside a fiber greater than 0.1 joules per square centimeter ($J/cm^2$) may be considered high-energy. A laser beam with optical power greater than 1 W may be considered high power. Ultra-short pulse widths may include laser beam pulses having duration of less than approximately 10 picoseconds. A laser beam with M-squared ($M^2$) less than 1.5 for the fundamental mode may be considered diffraction-limited beam quality. However, the hybrid waveguide may be suitable for use with laser beams having a pulse width of femtoseconds or picoseconds. The high energy and ultra-short pulse width laser beams will not cause laser irradiance or other effects that induce pulse distortion, beam quality distortion, and optical damage to the hybrid waveguide material.

The hybrid waveguide device of the present technology provides access to high power, high energy and high beam quality laser operating paradigms with robust waveguide functionality and design flexibility in their optical transfer function(s). This paradigm is not available with single-state-of-matter optical waveguide devices including solid core fiber and hollow-core resonant photonic bandgap fibers at least because the laser irradiance exceeds distortion and damage thresholds of such single state-of-matter waveguides.

Figure 1:
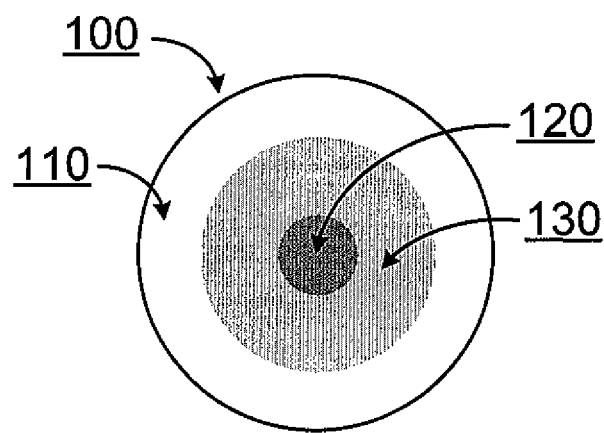
FIG. 1 illustrates a typical solid-core fiber waveguide of the prior art.
Figure 2:
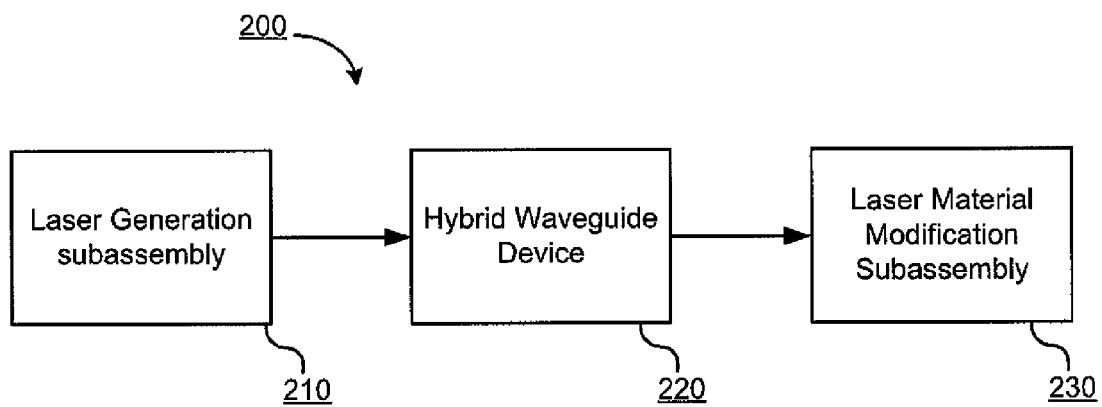
FIG. 2 illustrates a block diagram of a system for using a hybrid fiber waveguide.
Figure 3:
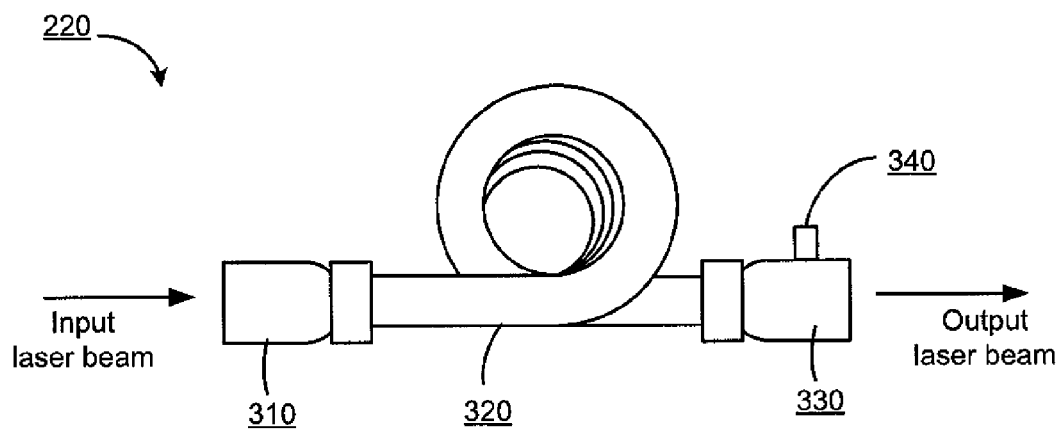
FIG. 3 illustrates an exemplary hybrid waveguide device.

FIG. 3 illustrates a block diagram of a system 200 for using a hybrid fiber waveguide. System 200 includes laser generation sub-assembly 210, hybrid waveguide device 220, and laser material modification sub-assembly 230. Laser generation sub-assembly 210 generates a laser beam and provides the laser beam to hybrid waveguide device 220. Hybrid waveguide device 220 may transport and modify the received laser beam to laser material modification sub-assembly 230.

Laser generation sub-assembly 210 may provide a high energy, high optical power, and ultra-short pulse laser beam to hybrid waveguide device 220. Chirped pulse amplification (CPA) is a technique for generating ultra-short pulses. A laser pulse may be generated and stretched. The stretched pulse is then optically amplified to increase pulse energy and compressed to a suitable duration. The ultra-short, high-energy high optical power pulse is then delivered by a delivery mechanism of a laser generation sub-assembly 210. An overview of ultra-short pulse lasers can be found in U.S. Pat. Nos. 7,349,452 B2 and 7,593,441 B2, both assigned to Raydiance Inc., of Petaluma, Calif., which are each incorporated herein by reference.

Hybrid waveguide device 220 receives the ultra-short pulse and high energy, high optical power laser beam and provides the laser beam to laser material modification sub-assembly 230. The hybrid waveguide device 220 is configured such that it is not damaged or otherwise affected by the high energy or other characteristics of the laser beam being transported. Hybrid waveguide device 220 is discussed in more detail below with respect to FIG. 3. Hybrid waveguide device 220 provides the laser beam to laser material modification sub-assembly 230, which may use the laser to modify or process a material.

FIG. 3 illustrates an exemplary hybrid waveguide device 220. Hybrid waveguide device 220 includes input portion 310, hybrid optical fiber 320, output portion 330 and gas(s) pressure mechanism 340. Input portion 310 may be used to couple hybrid waveguide device 220 to laser generation sub-assembly 210. The coupling may enable a high energy, high optical power and ultra fast pulse laser beam to be transferred to hybrid waveguide device 220 without affecting the integrity, shape, or other characteristic of the laser beam. The input portion 310 may include a focusing lens on an end coupled to the laser generation sub-assembly and a fiber connector towards the end coupled to the hybrid wavelength device.

The output portion 330 can be sufficiently miniature (<10 mm) so as to fit within a catheter assembly for minimally invasive surgery for tissue removal or other therapeutic ultra-short pulse laser application inside a medical patient. Miniature hermetically sealed micro-optic focusing lens assemblies are readily manufactured for telecommunications network components and traditional laser surgical devices. The functional design properties of the present output portion 330 can be merged with the micro-optic format.

Fiber 320 may be a hybrid fiber used for generation and/or transport of femtosecond or picosecond laser pulses. The laser pulses may have ablative-pulse-energy and optical power levels. Ablative pulse energy levels are energy levels high enough to achieve ablation in a material. Ablative optical power levels are power levels high enough to achieve meaningful ablation speed.

The hybrid fiber may have a first core portion and a second core portion. The first core region may include an inner hollow structure pressurized with a gas, or evacuated to form vacuum. The second core structure may have a solid structure filled with a gas, a vacuum, a few gases, or a combination of such in different regions within the second core. The second core is used together with the first core as a transport medium for a high energy high optical power ultra-short pulse laser beam.

An exemplary hybrid waveguide device 220 may incorporate multiple functions associated with an ultra-short pulse laser application. The output portion 330 may include means to collect optical signals from the application site used for process monitoring or diagnostic feedback and control of the laser. The optical signals may comprise laser induced breakdown spectroscopy (LIBS), coherent anti-Stokes Raman spectroscopy (CARS), temporal monitoring of plasma emission, optical coherence tomography (OCT), or direct imaging of the application plane. The output portion 330 may include means to direct gas or liquid flow to the application zone for debris management, therapeutic treatment, or irrigation.

The gas or vacuum in the first core region has an index of refraction. The solid matter, the gas species, or vacuum in the second core region have indices of refraction. The first core has a laser beam effective index of refraction. The effective index of refraction of the first core is determined by the laser beam and the index of refraction of the gas or vacuum. The second core has a laser beam effective index of refraction. The effective index of refraction of the second core is determined by the laser beam, the indices of refraction of the solid matter, the gas species, the vacuum, and the geometric distribution of the multiple-states-of-matter and multiple-species.

The static linear and irradiance-dependent indices of refraction of the gas or vacuum in the first core can be adjusted by gas species, gas temperature and gas pressure.

The index of refraction of the solid matter in the second core can be adjusted by solid matter species such as fused silica and other doped solid glass and ceramics. The indices of refraction of the gas(s) matter in the second core can be adjusted by gas species, gas temperature and gas pressure.

The effective index of refraction of the first core can be higher than the effective index of refraction of the second core so the laser beam can be confined inside the first core region by index wave-guiding mechanism. The numerical aperture of the first core, determined by the effective index of refraction difference between the first core and second core can be much lower than a single-matter core fiber, for example, much less than 0.03. The small value of numerical aperture enables single mode or a few modes propagation with much larger first core size than single-matter core, e.g. greater than 30 micrometers (μm) in diameter.

Hybrid waveguide fiber with polarization maintaining or polarizing functionalities can be realized by adjusting the index of refraction profile in the second core region by methods such as introducing different gases with different indices of refraction into different hollow locations in the second core region, and controlling temperature and pressure in different locations in the second core region. An example of a hybrid waveguide fiber with gases contained within hollow locations of a core is described in more detail with respect to FIG. 5. Alternatively, polarization properties can be sustained by modest geometrical asymmetry created between the orthogonal transverse planes of the fiber similar to Panda, Bowtie, or Elliptical core solid fibers.

The effective index of refraction of the first core can be lower than the effective index of refraction of the second core so the laser beam can be confined inside the first core region by anti-guiding mechanism such as quasi-photonic bandgap of the second core region. By using gases with higher indices of refraction than vacuum or air, the web structure in the second core region can be much thicker while maintaining a quasi-photonic bandgap with a broad bandwidth. Thicker web structure in the second core region enables fabrication feasibility of much larger size of the first core, for example larger than 30 micrometers (μm) in diameter, for high energy high optical power ultra-short pulse laser beam transportation without physical damage to the hybrid waveguide fiber input and output facets and without beam distortion.

Gases can be introduced into the first core and different locations in the second core region from the hybrid waveguide fiber input end, output end (FIG. 3), side of the fiber via micro-holes, multiple locations along the fiber, or a combination of such.

Portions of the second core material extend outward from the first core to form the second core region. The second core solid material extending from the first core may be in a pattern or some other configuration, thereby forming a hollow first core region. The outward extending second core structure may extend straight out from the first inner core, extend outward in a pattern, or in some other configuration. Propagating through the hybrid fiber, laser light may exist both in the first and the second core region of the hybrid fiber.

Figure 4A:
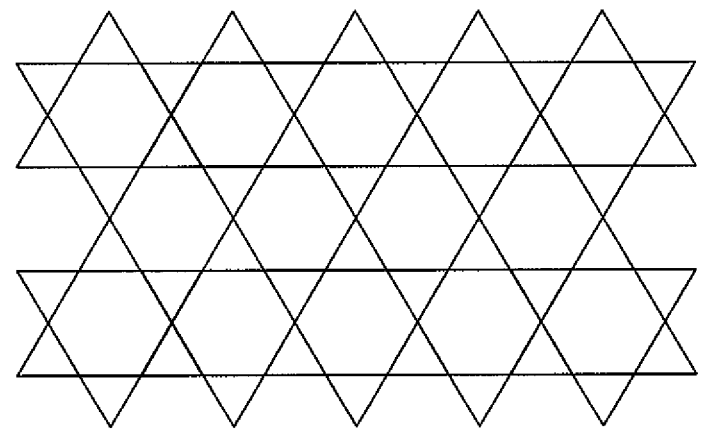
FIG. 4A illustrates an exemplary Kagome pattern.
Figure 4B:
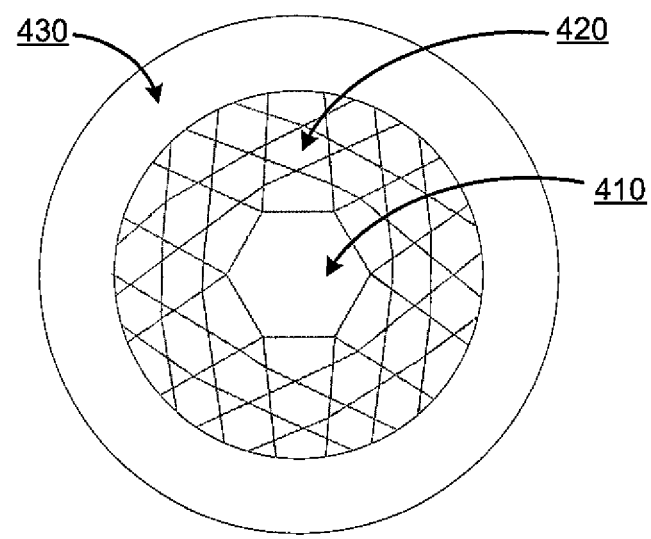
FIG. 4B illustrates a cross section of an exemplary hybrid fiber waveguide having a core with a Kagome pattern.

The second core structure may extend outward a Kagome pattern. FIG. 4A illustrates an exemplary Kagome pattern formed by a series of oblique crossed lines and horizontal lines. A Kagome pattern is a geometrical pattern defined by partially overlapping triangles that form hexagonal shapes. FIG. 4B illustrates a cross section of an exemplary hybrid fiber waveguide having a second core structure in the form of an exemplary Kagome pattern. The fiber waveguide cross section of FIG. 4B illustrates a gas pressurized first core 410, a hollow region 420 formed by the second core structure extending outward in a Kagome pattern, and a protective outer layer 430. The first core is kept in place relative to the protective outer layer by the outward extending Kagome pattern in the second core region.

The hollow portions of the second core region formed by the outward extending structure such as Kagome pattern may contain a gas, a few gases, or a vacuum located in different individual hollow portions. The type of gases used may be a noble gas such as helium or argon. The gas may be inserted into the waveguide by use of a pressure mechanism 340. Pressure mechanism 340 may be used to introduce a volume of one or more gases into different regions of the hybrid waveguide and maintain the gases in the waveguide at a constant pressure. The pressure mechanism can also be used to adjust the pressure of individual gases contained within the hybrid waveguide device. Pressure mechanism 340 is discussed in more detail below with respect to FIGS. 7-8.

Figure 5:
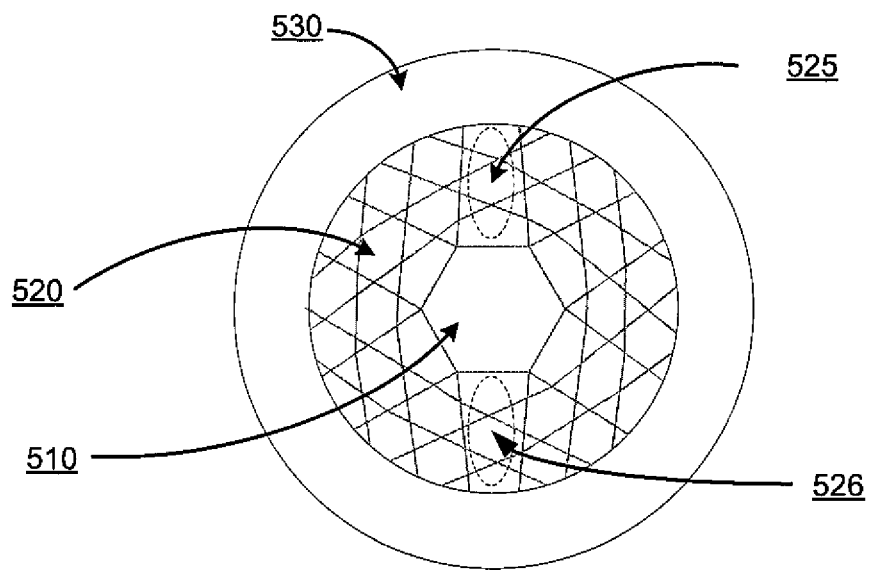
FIG. 5 illustrates a cross section of another exemplary hybrid filter waveguide having a core with a Kagome pattern.

FIG. 5 illustrates a cross section of an exemplary hybrid filter waveguide having a core with a Kagome pattern. The hybrid filter waveguide includes a gas pressurized first core 510, a hollow region 520 formed by the second core structure extending outward in a Kagome pattern, and a protective outer layer 530. The waveguide in FIG. 5 illustrates a polarization maintaining (PM) structure as a PM fiber.

Within the core structure of hollow region 520, one or more gases may be introduced into portions of the structure. The one or more gases may have a different index of refraction than other gases in other portions of the structure. For example, portions 525 and 526 of the structure may each have a matching gas having a lower index of refraction that that of the gas used to fill other portions of the second core. Introducing a gas with a lower index of refraction into two opposite holes in the second core may form birefringence of pulses passing through the core.

Figure 6:
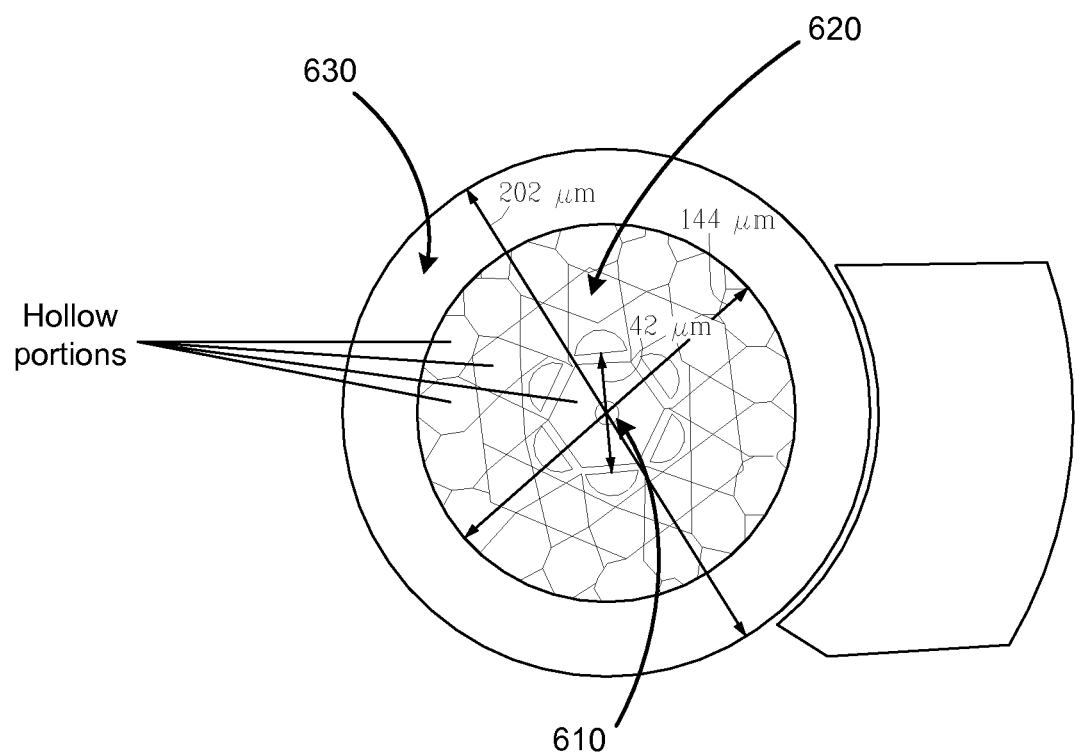
FIG. 6 illustrates an image of a cross-section of an exemplary hybrid waveguide optical fiber.

FIG. 6 illustrates an image of a cross-section of an exemplary hybrid waveguide fiber. The cross-section image depicts a hybrid waveguide device with a first core portion 610, a second core portion 620, and an outer protective layer 630. The first core portion 610 may be a hollow core pressurized by a gas, a gas mixture, or vacuum. The second core portion 620 may extend from the first core portion as patterned structure which forms hollow portions as indicated in FIG. 6. The first core portion may be in a hexagonal shape and having a cross section width of 42 micrometers (μm). The protective layer 630 may have an outer diameter of 202 micrometers (μm) and an inner diameter of 144 micrometers (μm).

The cross-section of an exemplary hybrid waveguide fiber may be highly asymmetric, e.g. greater than 2:1 dimension ratio, in orthogonal transverse planes so as to form an elliptical core, a ribbon type fiber, or a planar waveguide. The asymmetric hybrid waveguide may enable polarization properties to the device or provide greater mode area scaling capabilities.

Returning to FIG. 3, output portion 330 may be used to couple hybrid waveguide device 220 to laser material modification subassembly 230. The coupling may enable a high energy high power and ultra fast pulse laser beam to be output by hybrid waveguide device 220 without affecting the integrity, shape, or other characteristic of the laser beam. Input portion 310, output portion 330, and hybrid waveguide fiber portion 320 may also include a pressure mechanism for introducing gas, gases, or gas mixture into waveguide fiber 320, maintaining pressure of gases within the fiber, or adjusting the gases pressure within the core of fiber 320.

Figure 7:
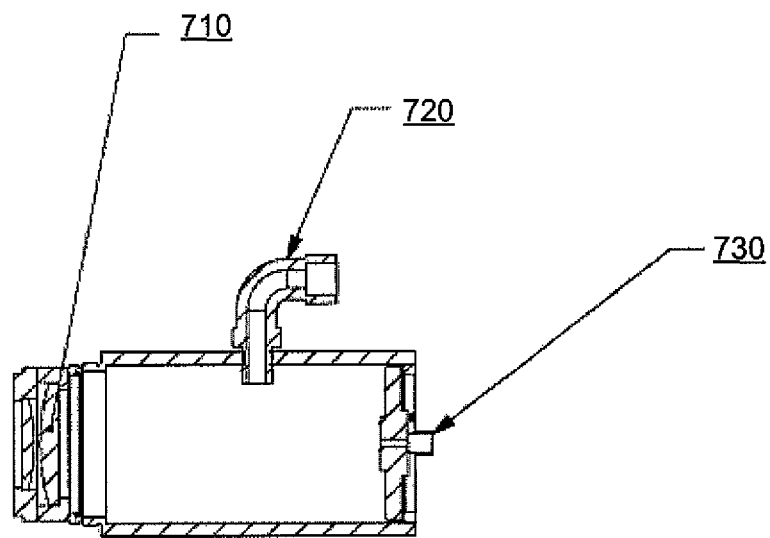
FIG. 7 illustrates an exemplary end portion of a hybrid waveguide device.
Figure 8:
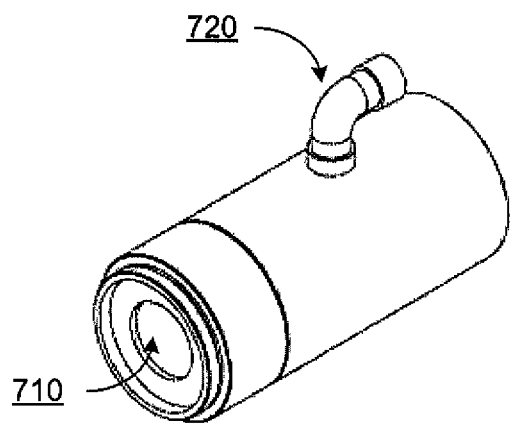
FIG. 8 illustrates a perspective view of the exemplary end portion of a hybrid waveguide device.

FIGS. 7-8 illustrate an exemplary end portion of a hybrid waveguide device. The end portion of the hybrid waveguide device includes housing having a focusing lens 710 at one end of the housing and a fiber connector 730 at another end of the housing. A gas fitting 720 (i.e., pressure mechanism) is also incorporated into the housing. The end portion size may be sufficiently small—without sacrifice in functionality—to integrate within a medical catheter assembly for minimally invasive surgical techniques.

The portion illustrated and discussed with respect to FIGS. 7-8 may be used as either input portion 310 or output portion 330 in the hybrid waveguide device of FIG. 3. As input portion 310, the end portion illustrated in FIGS. 7-8 may be used to receive a laser beam for the hybrid waveguide device rather than output a laser beam. As output portion 330, the end portion is used to provide a laser beam to laser material modification sub-assembly 230.

Focusing lens 710 may be used to focus a laser beam. When used as output portion 320, lens 710 is used to focus a laser beam provided to laser material modification sub-assembly 230. When used as input portion 310, the input portion 310, the focusing lens may be used to focus a laser beam received from laser generation sub-assembly 210. Fiber connector 730 may be used to connect to fiber 320 of the hybrid waveguide device.

Gas fitting 720 may be used to adjust the amount of gas contained within hybrid waveguide device 220. The gas fitting may be coupled to a gas source. The gas source may provide a desired amount of gas into fiber 320 through gas fitting 720. The amount of gas within fiber 320 may be adjusted by adding additional gas or allowing gas to escape from the fiber through gas fitting 720.

The gas may be introduced to the hybrid waveguide device via the input portion or the output portion configured with a gas fitting 720. The end portion may protect the fiber tip at both the input and output from contamination such as debris and dusts. When introducing gas via the output portion, the fiber facet may be purged and/or sealed inside a housing assembly. This provides for easier repair of the input facet if damaged.

The gas type(s) and partial pressure(s) of the gas within the hybrid waveguide device may be selected to enable a well-controlled nonlinear optical process used for practical applications. One such application may be conversion of input photons at one wavelength into output photons at other wavelengths, such as with optical frequency harmonic generation and/or supercontinuum generation. Enhanced temporal or spatial confinement of the laser pulse energy may be induced to achieve athermal ablation with the output beam.

Another application of the hybrid waveguide device is to achieve laser pulse phase modification. Phase modification may be achieved as linear-optical-effect chromatic dispersion imposed onto propagating laser pulses. The modification may be used for practical applications, such as temporal compression of ultra-short laser pulses for purpose of athermal materials modification. Phase modification may be achieved via irradiance-dependent nonlinear optical interactions with the constituent species of matter.

Another application of the hybrid waveguide device is a laser beam spatial mode quality optimizer. The input beam can have undesirable shape or spatial intensity distribution. The gas and solid core may manipulate the distribution to provide a modified output laser beam. The laser beam output by the hybrid waveguide device may have a well-defined spatial profile prescribed by the stable waveguide mode and standard diffraction-limited beam propagation after the waveguide exit port.

Figure 9:
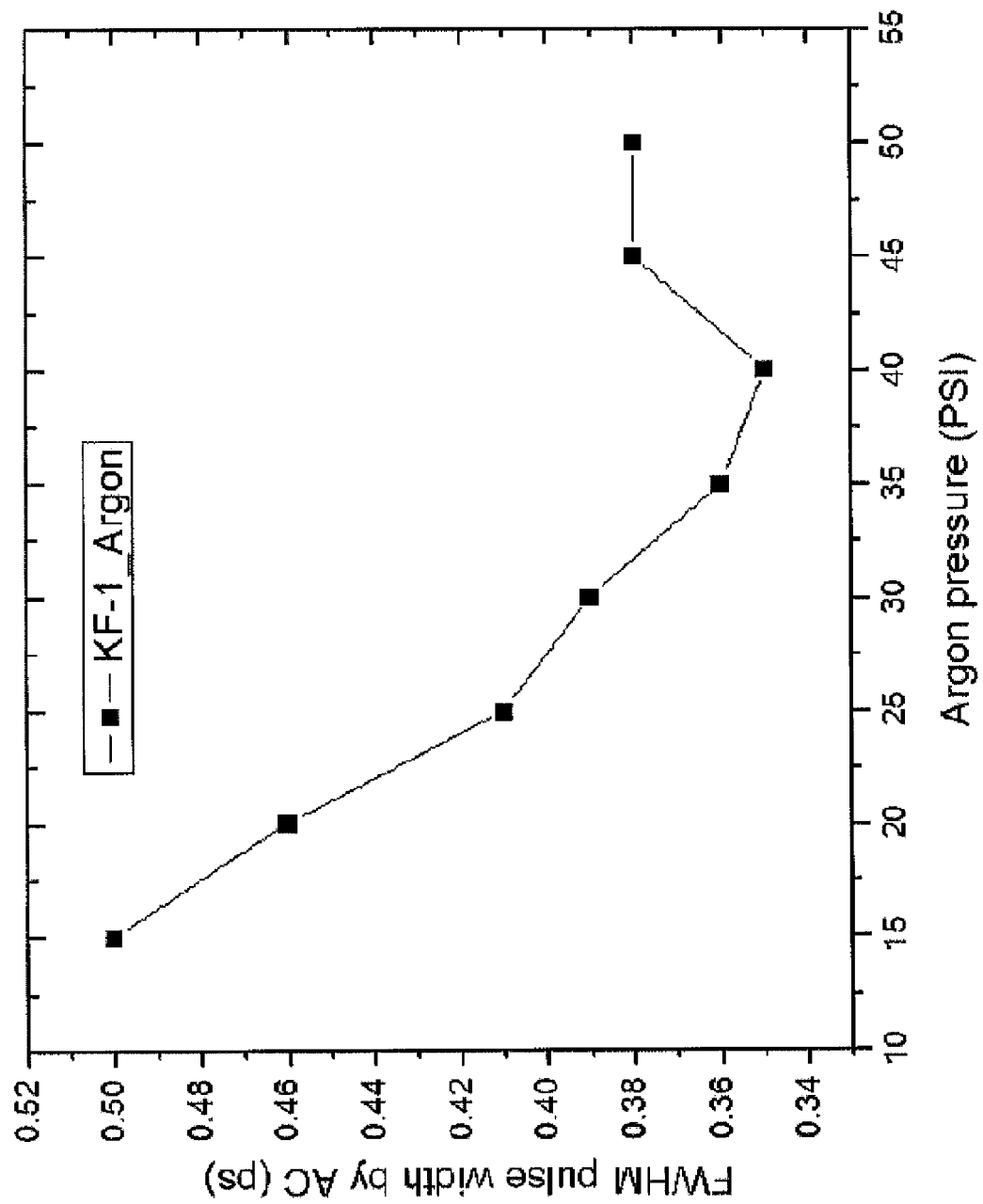
FIG. 9 illustrates a plot of argon gas pressure versus pulse width for an exemplary hybrid waveguide device.

FIG. 9 illustrates a plot of pressure versus pulse width for an exemplary hybrid waveguide fiber device. The plot of FIG. 9 is based on Argon gas introduced both into the first core and the second core regions. As illustrated, as the pressure of Argon gas within a fiber 320 increases, the (full width half maximum) pulse width of the laser beam generally decreases. The pulse width decreases as the pressure increases from about fifteen (15) pounds per square inch (PSI) to about forty (40) PSI. When the pressure is increased to over forty PSI, the pressure-pulse width plot experiences a non-linear relationship as the pulse width increases slightly before maintaining a steady pulse width between forty-five to fifty PSI.

Figure 10:
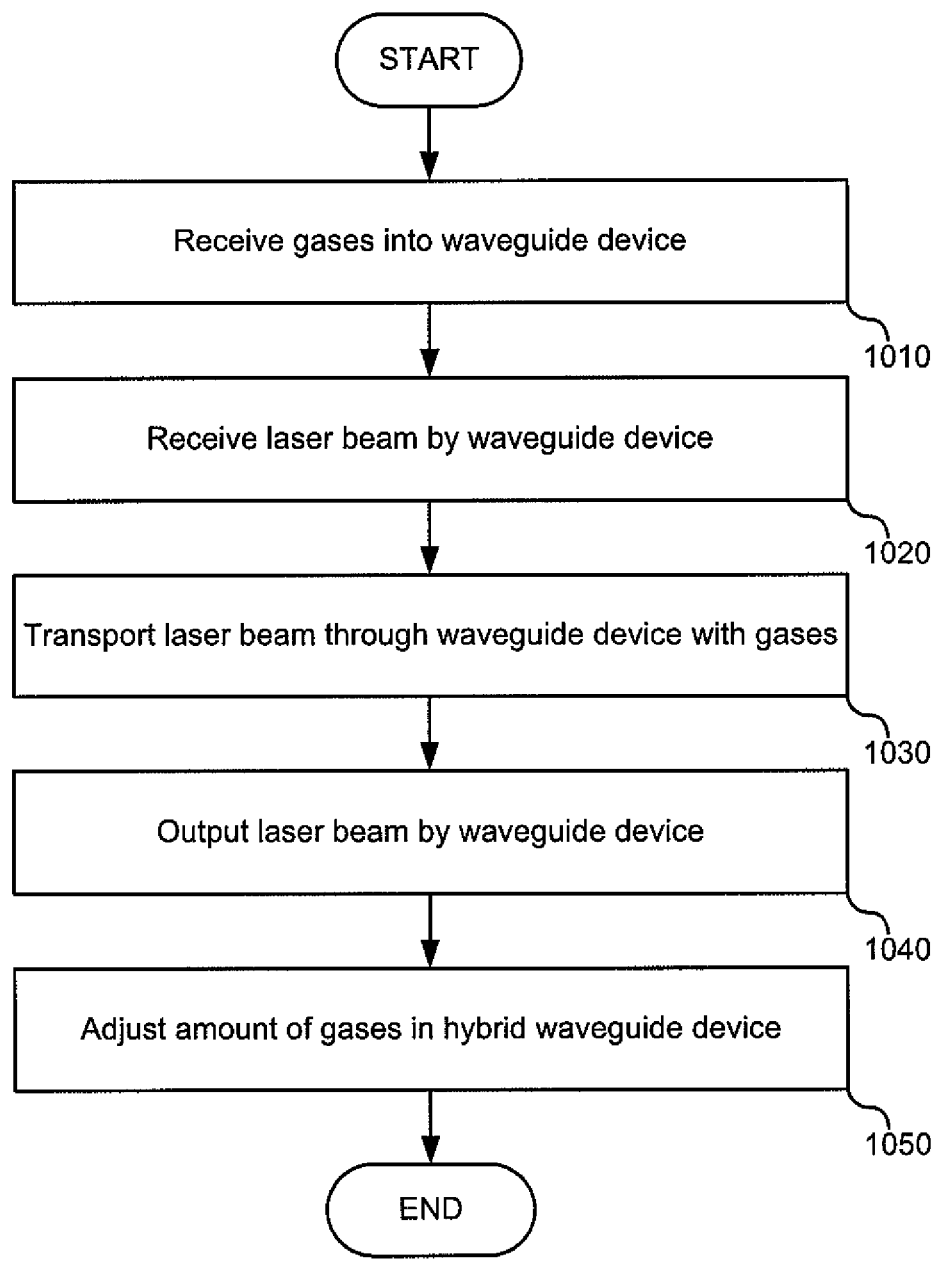
FIG. 10 is a flow chart of an exemplary method for operating a hybrid waveguide device.

FIG. 10 is a flow chart of an exemplary method for operating a hybrid waveguide device. A gas, gases, or gas mixture is received into the first core and the second core of the waveguide device at step 1010. The gas(es) may be received in the hybrid waveguide device through an end portion, such as for example the end portion associated with FIGS. 7-8. The gas may be received through an end portion at the input of the waveguide device, the output end of the waveguide device, or along the side of the hybrid fiber. The gases may be a noble gas or some other gas or gas mixture. Noble gases suitable for use within the hybrid waveguide device include helium and argon.

A laser beam having an ultra-short pulse width may be received by an input portion of the waveguide device at step 1020. The input portion may include a focusing lens and fiber connector and may provide the received laser beam to a fiber of the waveguide device. The laser beam may have pulse width of about ten (10) picoseconds or less. The laser beam may have pulse energy of about ten (10) microjoules (4) or more. The laser beam may have optical power of about one (1) watt (W) or more.

The received laser beam is transported through a core of the waveguide device at step 1030. The core may include a first portion and a second portion. Both the first and the second portion may contain the gases inserted into the waveguide device. For example, the second core portion may include a hollow portion formed by a web structure which extends from a hollow inner core (the first core portion). The second core portion may extend from the hollow inner core portion in a pattern such as a Kagome pattern. Gas can be inserted into a few desired hollow portions in the second core region to form a polarization maintaining or polarizing hybrid waveguide fiber.

While transporting the laser beam, the hybrid waveguide device performing the method of FIG. 10 may process the laser beam in such a manner as to be useful for one or more applications. For example, the laser beam may be converted from a first wavelength to a second wavelength, or multiple wavelengths, as the laser travels through the waveguide device. The conversion may be the result of optical frequency harmonic generation and/or supercontinuum generation. The conversion may also be based on inducement of enhanced temporal or spatial confinement of the laser pulse energy. The wavelength conversion may be useful to achieve athermal ablation using the output laser beam.

The hybrid waveguide may also perform phase modification while transporting the laser beam along the waveguide device. Laser beam pulse phase modification may involve linear-optical-effect chromatic dispersion that modifies propagating laser pulses. The phase modified laser beam may be beneficial to temporal compression of ultra-short laser pulses, for example for athermal materials modification.

While transporting the laser beam through the waveguide, the waveguide device may optimize spatial mode quality. The laser beam received at step 1020 may have an undesirable shape or spatial intensity distribution. After being transported through the hybrid waveguide of the present technology, the output beam may be corrected and have a well-defined spatial profile prescribed by the stable waveguide mode. The output laser beam may also have standard diffractive beam propagation afterward provided through the output of the hybrid waveguide device.

The laser beam having an ultra-short pulse width is provided through an output of the waveguide device at step 1040. The laser beam may be output though output portion 330 and may be provided to laser material modification sub-assembly 230.

At some point during the method of FIG. 10, the amount of gases in the hybrid device may be adjusted at step 1050. The adjustment may include adding more gas to increase the gas pressure within the core. The adjustment may also include allowing gas to release to reduce the pressure of gas within the core. The adjustment may also include introducing different gas species with different indices of refraction and breakdown thresholds.

The embodiments disclosed herein are illustrative. Various modifications or adaptations of the systems and methods described herein can become apparent to those skilled in the art. Such modifications, adaptations, and/or variations that rely upon the teachings of the present disclosure and through which these teachings have advanced the art are considered to be within the spirit and scope of the present invention. Hence, the descriptions and drawings herein should be limited by reference to the specific limitations set forth in the claims appended hereto.

What is claimed is:

1. A hybrid waveguide device for providing an ultra-short duration optical pulse,
   comprising:
   a hybrid waveguide fiber;
   a first core region comprising at least one of a gas, a gas mixture and a vacuum within the hybrid waveguide fiber and configured to transport a laser beam having an ultra-short pulse; and
   a second core region surrounding the first core region, the second core region comprising a solid web structure having a plurality of hollow regions each filled with at least one of a gas, a gas mixture, and a vacuum within the hybrid waveguide fiber, wherein the second core region is configured such that gas characteristics within select hollow regions are adjusted to achieve specific light transport characteristics for the laser beam.

2. The waveguide device of claim 1, the waveguide fiber including a hollow core hybrid fiber, the first core region and the second core region contained within the hybrid fiber,
   the first core region and the second core region forming a core of the hybrid waveguide fiber.

3. The waveguide device of claim 1, the first core region including a hollow region with a core diameter greater than 30 micrometers.

4. The waveguide device of claim 1, wherein the second core region includes Kagome-patterned web structure.

5. The waveguide device of claim 1, the second core region including at least one of a gas, a gas mixture, and a vacuum throughout the length of the waveguide fiber.

6. The waveguide device of claim 1, wherein the waveguide fiber is able to transport a laser beam having a pulse width duration of less than 10 picoseconds.

7. The waveguide device of claim 1, wherein the waveguide fiber is able to transport a laser beam having a pulse energy of greater than 10 microjoule.

8. The waveguide device of claim 1, wherein the waveguide fiber is able to transport a laser beam having an average optical power of greater than 1 watt.

9. The waveguide device of claim 1, wherein the waveguide fiber is able to transport a laser beam having a wavelength from 200 nanometers to 10,000 nanometers.

10. The waveguide device of claim 1, wherein the waveguide fiber is able to transport a laser beam having a pulse fluence of greater than 0.1 joules per square centimeter (J/cm2).

11. The waveguide device of claim 1, wherein at least one of the gases is a noble gas.

12. The waveguide device of claim 1, wherein the second core region is configured for polarization maintaining or polarizing functionality.

13. The waveguide device of claim 1, further comprising one or more gas fittings coupled to the waveguide fiber and configured to introduce the gas into the waveguide fiber from fiber ends, along the fiber, or a combination of fiber ends and along the fiber.

14. The waveguide device of claim 1, the waveguide fiber configured to convert input photons at one wavelength into output photons at a different wavelengths.

15. The waveguide device of claim 1, the waveguide fiber configured to induce enhanced temporal or spatial confinement of the laser pulse energy.

16. The waveguide device of claim 1, the waveguide fiber configured to perform linear-optical-effect chromatic dispersion to modify a propagating laser pulse.

17. The waveguide device of claim 1, the waveguide fiber configured to perform as an index guiding mechanism within the core.

18. The waveguide device of claim 1, the waveguide fiber configured to perform as a photonic bandgap guiding mechanism in the core.

19. A method for transporting a laser beam using a waveguide device, comprising:
   receiving a laser beam having an ultra-short pulse width by an input portion of a hybrid waveguide device;
   transporting the laser beam through a core of the hybrid waveguide device, the core of the hybrid waveguide device comprising a first portion and a second portion, the first portion containing at least one of a gas, a gas mixture, and a vacuum, the second portion comprising a solid web structure having a plurality of hollow regions each filled with at least one of a gas, a gas mixture, and a vacuum within the hybrid waveguide fiber, wherein gas characteristics within select hollow regions are adjusted to achieve specific light transport characteristics for the laser beam; and
   providing the laser beam through an output portion of the hybrid waveguide device.

20. The method of claim 19, further comprising receiving the gas into a portion of a waveguide device fiber.

21. The method of claim 19, further comprising adjusting the amount of gas, gases, gas mixture, and vacuum in the core of the waveguide device.

22. The method of claim 19, wherein at least one of the gases is a noble gas.

23. The method of claim 19, wherein the gas is helium or argon.

24. The method of claim 19, wherein the solid web structure is comprised of silica web structure.

25. The method of claim 19, wherein the first core portion is a hollow core.

26. The method of claim 19, wherein the plurality of hollow regions are formed along the length of the waveguide.

27. The method of claim 19, wherein the second core portion is configured in a Kagome pattern.

28. The method of claim 19, further comprising converting the signal from a first wavelength to a second wavelength, the provided laser beam having the second wavelength, or a combination of wavelengths.

29. The method of claim 19, further comprising performing temporal compression of the laser bean within the waveguide, the provided laser beam being temporally compressed.

30. The method of claim 19, wherein the waveguide device and output portion have a cross-section diameter less than ten millimeters (<10 mm).

31. The method of claim 19, wherein the waveguide device and output portion are integrated to form a micro-optical medical catheter assembly.

32. A hybrid waveguide device subassembly, comprising:
a housing;
a fiber connector within the housing and configured to connect to a hybrid waveguide fiber including a first core region comprising at least one of a gas, a gas mixture and a vacuum, and a second core region surrounding the first core region and comprising a solid web structure having a plurality of hollow regions each filled with at least one of a gas, a gas mixture, and a vacuum; and
one or more gas fittings configured to receive and release gas into the housing,
the hybrid waveguide device subassembly configured to provide gas received through the gas fitting to the hybrid waveguide fiber through the fiber connector, wherein gas is provided such that gas characteristics within select hollow regions are adjusted to achieve specific light transport characteristics for the laser beam.

33. The waveguide device subassembly of claim 32, further comprising a focusing lens for focusing a laser beam.

34. The waveguide device subassembly of claim 32, wherein a laser beam is provided to the hybrid waveguide fiber by the fiber connector.

35. The waveguide device subassembly of claim 32, wherein a laser beam is received from the hybrid waveguide fiber by the fiber connector.

36. The waveguide device subassembly of claim 32, the fiber connector configured to transport a laser beam having an ultra-short pulse width.

37. The waveguide device subassembly of claim 32, wherein the subassembly diameter is less than ten millimeters (<10 mm).

38. The waveguide device subassembly of claim 32, wherein the subassembly is integrated in a medical catheter assembly.

39. The waveguide device of claim 13, wherein the one or more gas fittings and the hybrid waveguide fiber are configured to adjust the at least one of the gas, the gas mixture, and the vacuum within the select hollow regions.

* * * * *